E. E. LAWRENCE.
SCRAPPER FOR DOUGH CUTTING MACHINES.
APPLICATION FILED MAY 12, 1910.

1,032,069.

Patented July 9, 1912.

2 SHEETS—SHEET 1.

E. E. LAWRENCE.
SCRAPPER FOR DOUGH CUTTING MACHINES.
APPLICATION FILED MAY 12, 1910.

1,032,069.

Patented July 9, 1912.
2 SHEETS—SHEET 2.

Witnesses
Ernest A. Telfer
Carl L. Choate.

Inventor:
Edward E. Lawrence
by Emery, Booth, Janney and Varney,
Attys.

UNITED STATES PATENT OFFICE.

EDWARD E. LAWRENCE, OF CAMBRIDGE, MASSACHUSETTS, ASSIGNOR TO LOOSE-WILES BISCUIT COMPANY, OF KANSAS CITY, MISSOURI, A CORPORATION OF MISSOURI.

SCRAPPER FOR DOUGH-CUTTING MACHINES.

1,032,069. Specification of Letters Patent. Patented July 9, 1912.

Application filed May 12, 1910. Serial No. 560,805.

*To all whom it may concern:*

Be it known that I, EDWARD E. LAWRENCE, a citizen of the United States, and a resident of Cambridge, in the county of Middlesex and Commonwealth of Massachusetts, have invented an Improvement in Scrappers for Dough-Cutting Machines, of which the following description, in connection with the accompanying drawings, is a specification, like letters on the drawings representing like parts.

This invention relates to scrappers for dough cutting machines.

In order that the principle of the invention may readily be understood, I have disclosed a single embodiment thereof in the accompanying drawing, wherein—

Figure 1:
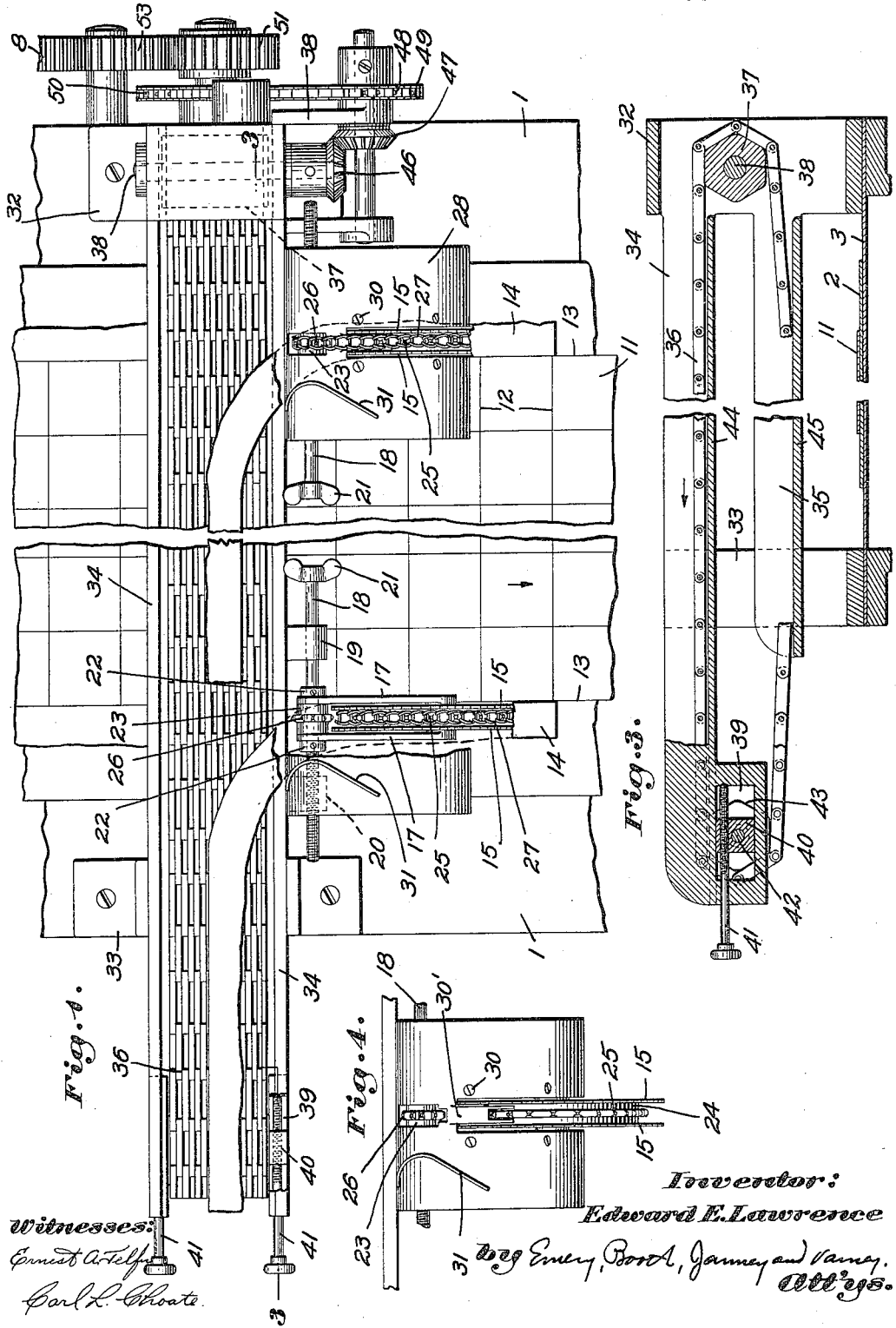
Figure 2:
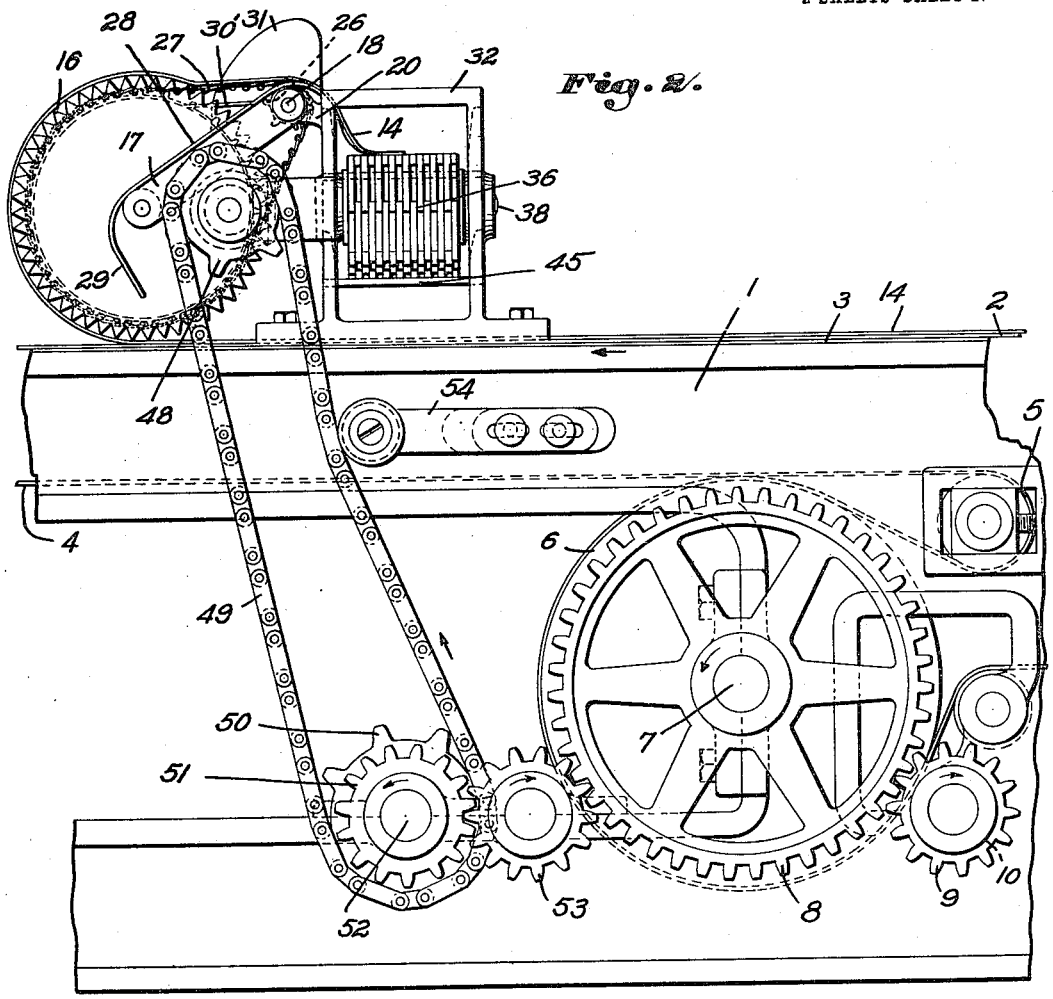

Figure 1 is a plan view of a scrapper embodying my invention and sufficient parts of a dough cutting machine to show its relation thereto; Fig. 2 is a side elevation of the construction shown in Fig. 1; Fig. 3 is a transverse section upon the irregular line 3—3 of Fig. 1; and Fig. 4 is a detail in plan of the scrap remover with coöperating guard and ejector.

Cracker, biscuit and similar machines as usually constructed are provided with a conveyer preferably in the form of an endless belt, upon which the material is delivered in thin sheet form from a hopper. As the material is delivered from the hopper, it is compressed into sheet like form by passing between rollers and as delivered upon the belt it is of more or less irregular width with uneven lateral edges. After having been deposited upon the conveyer, the dough or similar body material is operated upon by a series of cutters penetrating the body material and nearly but preferably not wholly severing it into a series of biscuit or cake blanks which are subsequently removed from time to time by peelers and placed in the oven. The cutting knives or dies are so constructed as to penetrate the body material in lines transverse to the conveyer and preferably at right angles to its lateral edges, and also in lines parallel to the edges of the conveyer, or, in other words, normal to the said transverse lines of cut. It will be evident that between the outer longitudinal lines of cut and the irregular lateral edges of the body material there is left upon each side a portion of waste usually termed "scrap". It has heretofore been proposed to remove this scrap by toothed disks positioned adjacent opposite edges of the conveyer and so located that the disk teeth enter the said longitudinal lines of cut by which the scrap is separated from the body material. These disks have been so inclined with respect to the path of movement of the body material that the edge scraps are deflected laterally and crowded off each edge of the conveyer.

I have provided improved means for removing said edge scraps and preferably by a lifting movement of said scraps as contrasted to a lateral deflection thereof as above referred to.

Referring more particularly to the drawings, the framing of the machines is represented at 1, it being of any suitable construction and material. Supported thereon and driven in any suitable manner, not herein shown, but preferably continuously, is a dough conveyer 2 preferably in the form of an endless belt which may be of canvas or other suitable material. As shown in Fig. 3, the upper run of said belt is supported upon a transverse plate 3. As shown most clearly in Fig. 2, the lower run of the belt passes about an adjustable belt tightener 5 and thence about a pulley 6 upon a shaft 7 which constitutes the main driving shaft of the scrap removing mechanism. Fast upon said shaft is a gear 8 wherewith meshes a pinion 9 having a rubber or other suitable roll 10 to contact with the belt as it passes about the pulley 6. It is apparent, however, that any suitable driving and guiding means for the conveyer may be provided and that the latter may be of any suitable type. The body material is represented in Fig. 1 at 11, the transverse lines of cut being indicated at 12, the edge longitudinal cuts at 13 and the edge scraps at 14. In order effectively to remove the edge scraps from the body material I separate them therefrom by an upward lifting movement and preferably by means positioned above the path of travel of the body material and also preferably having impaling members which penetrate the edge scraps and lift them from the plane of travel of the body material.

As shown most clearly in Figs. 1, 2 and 4, I provide two scrap removers, each comprising a pair of spaced disks 15 having sharp scrap penetrating teeth 16. Said disks 15 are loosely mounted upon a pin carried by the outer ends of the spaced arms 17—17 loosely mounted upon a spindle 18 passing through ears 19, 20 upon a part of the frame to be described, and threaded into the ear 20 to permit lateral adjustment of the disks with respect to the edge scrap with which it coöperates. Said spindle is provided with a wing nut 21 to effect such lateral adjustment and with collars 22 and hub 23 to position said arms 17—17. As most clearly shown in Fig. 4, the disks 15 have formed therewith or received between them a hub 24 provided with sprocket teeth 25, about which and about sprocket teeth 26 on the hub 23 passes a sprocket chain 27, the function whereof is to assist in supporting the scrap impaled upon the disks 15 and to aid in ejecting it therefrom.

It will be apparent that each pair of disks 15—15 is yieldingly supported by its arms 17—17, so that said disks may yield to and from the plane of the body material to accommodate themselves to any unevenness in thickness of the latter and thereby to prevent too deep penetration of the edge scraps. Preferably the teeth 16 of said disks do not wholly penetrate the scrap material, thus preventing the accidental tearing of the conveyer in case the latter be a fabric material and the injury to the teeth of the disks. The said teeth 16 are sharpened to points and penetrate the scrap material sufficiently to impale the material thereon and to permit it to be lifted and thereby torn or severed from the body material by a direct lifting movement. In this manner a clearer line of separation is secured between the scrap material and the body material which usually are still connected by a thin film.

The spaced disks 15 of each scrapper provide a sufficiently wide support for the scrap material to sustain the latter in an extended condition as it is lifted from the plane of the body material and carried up and over to the point of discharge. Moreover as shown most clearly in Fig. 2, the sprocket chain 27 supports the scrap material as it passes from the disks 15 rearwardly toward the sprocket pinion 26.

In order to prevent the scrap material from dropping upon operating parts of the mechanism, I preferably provide a guard 28 of sheet material and having a down turned forward end 29. The said guard may be directly secured, as by screws 30, to the arms 17, so as to partake of the movement of the latter. The said guard is centrally cut away as shown to receive the disks 15 and also to receive the sprocket pinion 26. Preferably also I provide said guard with an ejecting tongue 30′ shown most clearly in Figs. 2 and 4 and extending between the disks 15 into close proximity to the sprocket gear 25 and thereby insure the removal of the scrap material that may have adhered thereto. It will be apparent that the sprocket chain 27 not only aids in supporting the scrap material, as stated, but that it acts as an ejector to remove the scrap material from the teeth of the disks 15 as most clearly indicated in Fig. 2. Preferably I provide each guard 28 with a guide 31 serving to direct the material as indicated most clearly in Fig. 1. The scrap material is removed from the disks 15 and onto a suitable discharger. Preferably this discharger is a carrier having a path of movement transverse to that of the dough conveyer. Heretofore in the art a laterally extending discharger has been provided in conjunction with a toothed disk remover but such discharger has been positioned below the dough conveyer, because of the fact that the scrap edges have been laterally deflected from each edge of the conveyer and dropped thereonto. Inasmuch as in the present form of the invention the scrap material is impaled upon the disks 15 and thereby lifted from the plane of the body material, and also in order to effect the most compact arrangement of parts while also permitting ready access to the disks 15, 1 position the discharger above the dough conveyer 2.

As shown most clearly in Figs. 1, 2 and 3, I secure to the upper surface of the frame 1 and adjacent opposite lateral edges thereof housing brackets 32, 33, the former being of substantially rectangular shape, as indicated in Fig. 2, and having laterally extending therefrom trough like portions 34, 35 received in and supported by the opposite bracket 33. I mount upon the bracket 32 and its extension 34 an endless conveyer, here shown as a link belt 36 received upon a polygonally shaped driver 37 fast upon a stud shaft 38 mounted in bearings in said bracket 32. The trough like member 34 preferably projects laterally beyond the bracket 33 and is provided with ways 39 receiving therein bearing blocks 40 adjustable by means of threaded pins 41 to secure the proper tension of the belt 36. The bearing blocks 40 receive therein a stud 42 having mounted thereon a polygonal belt receiving member 43. The upper and lower runs of the belt 36 are supported upon the bottoms 44, 45 of the trough like extensions 34, 34.

The belt 36 may be driven in any suitable manner. Herein for the purpose the stud shaft 38 is provided, as shown in Fig. 1, with a beveled gear 46 driven from a similar gear 47 supported upon a bracket 48 extending from the housing bracket 32. Coaxial with and fast with the beveled gear 47 is a sprocket pinion 48 receiving a sprocket chain 49 driven from a sprocket gear 50 co-axial with a gear 51 upon a stud shaft 52 mounted in the framing and driven from the gear 8 by an intermediate or idler 53. If desired, a belt tightener 54 may be provided for the sprocket chain 49.

As shown in Fig. 2, the edge scraps impaled upon the teeth of the disks 15 and thereby lifted from the plane of the body material are conveyed rearwardly and deposited upon the discharge belt 36. As clearly evident from Fig. 1, both side scraps are delivered at the same side of the dough conveyer 2 and by a lateral movement wholly in the same direction. If desired, the guards 28 may also be secured to the trough like extensions 34. Said guards serve also to support the material as it is conveyed by the ejecting sprocket chain 27 onto the discharging belt 36.

It will be apparent from the foregoing description that I have provided a compact, simple and efficient mechanism for separating the edge scrap from the body material by a lifting movement, and thence conveying it upwardly, rearwardly and then transversely to any suitable receptacle into which it is dropped by the belt 36. Inasmuch as the endless belt or dough conveyer 2 is continuously driven, the scrap removers are also continuously driven. This continuous driving of the conveyer 2 is rendered possible by reason of the fact that the cutting knives or dies travel with the conveyer during the cutting action. In other words, it is not necessary to stop the movement of said conveyer during said cutting action, and hence the operation of the entire mechanism is continuous.

Having thus described one illustrative embodiment of my invention, I desire it to be understood that although specific terms are employed, they are used in a generic and descriptive sense and not for purposes of limitation, the scope of the invention being set forth in the following claims.

Claims:

1. Scrap removing mechanism for cracker and like machines comprising in combination a dough conveyer, means to cut the edge scrap from the body of the dough and edge scrap lifting means to engage only the edge scrap exterior to the longitudinal line of cut and to separate the same from the body of the dough by a lifting movement.

2. Scrap removing mechanism for cracker and like machines comprising in combination a dough conveyer and rotary scrap impaler operable independently of one another.

3. Scrap removing mechanism for cracker and like machines comprising in combination a dough conveyer and a traveling scrap impaler driven by the movement of the dough.

4. Scrap removing mechanism for cracker and like machines comprising in combination a dough conveyer, and a plurality of co-axial impaling disks to engage a single edge scrap and remove the same from the body material in an extended condition.

5. Scrap removing mechanism for cracker and like machines comprising in combination a dough conveyer, a scrap remover, a coöperating movable scrap ejector, and means to impart ejecting movement to said ejector.

6. Scrap removing mechanism for cracker and like machines comprising in combination a dough conveyer and a swing arm yieldingly mounted scrap remover.

7. Scrap removing mechanism for cracker and like machines comprising in combination a dough conveyer and scrap impalers yieldingly and independently mounted.

8. Scrap removing mechanism for cracker and like machines comprising in combination a dough conveyer, a forwardly extending arm loosely pivoted above the same and a toothed disk scrap remover pivoted upon said arm.

9. Scrap removing mechanism for cracker and like machines comprising in combination a dough conveyer, a loosely mounted arm extending in the direction of travel of said conveyer and a scrap remover and scrap ejector both carried by said arm.

10. Scrap removing mechanism for cracker and like machines comprising in combination a dough conveyer, and a coöperating scrap remover consisting of a pair of spaced disks and a traveling scrap supporter and ejector positioned therebetween.

11. Scrap removing mechanism for cracker and like machines comprising in combination a dough conveyer and a coöperating scrap remover consisting of a pair of spaced disks and a scrap supporter and ejector positioned therebetween, said disks and supporter and ejector being driven by the movement of the dough.

12. Scrap removing mechanism for cracker and like machines comprising in combination a framework, an endless traveling dough conveyer mounted thereon, a dough scrap remover, a traveling discharger arranged transversely of and above said conveyer and supporting housings for said discharger adjacent opposite edges of said conveyer.

13. Scrap removing mechanism for cracker and like machines comprising in combination a dough conveyer and a toothed disk scrap remover mounted in a plane normal to the plane of travel of the body material and adapted to engage and be driven by the dough upon said conveyer.

14. Scrap removing mechanism for cracker and like machines comprising in combination a dough conveyer, a scrap remover comprising a pair of spaced disks and an intervening hub and a traveling belt supported upon said hub.

15. Scrap removing mechanism for cracker and like machines comprising in combination a dough conveyer, means to automatically lift the scrap from the conveyer, and means to convey the scrap transversely of the conveyer.

16. Scrap removing mechanism for cracker and like machines comprising in combination a dough conveyer, a scrap remover driven by movement of said dough and a guard coöperating with said remover.

17. Scrap removing mechanism for cracker and like machines comprising in combination a dough conveyer, a scrap remover and a guard adjacent said remover and having a scrap ejecting tongue.

18. Scrap removing mechanism for cracker and like machines comprising in combination a dough conveyer, and means to discharge merely edge scraps from the conveyer at the same side of the dough conveyer.

19. Scrap removing mechanism for cracker and like machines comprising in combination a dough conveyer and means to remove scrap from both edges of the body material thereon by lateral movement wholly in the same direction.

20. Scrap removing mechanism for cracker and like machines comprising in combination a dough conveyer, a pair of scrap lifters and coöperating means to discharge both edge scraps at the same side of the dough conveyer.

21. Scrap removing mechanism for cracker and like machines comprising in combination a dough conveyer, a toothed disk scrap remover, and a spindle whereon said disk is mounted, said spindle being threaded for lateral adjustment of the disk.

22. Scrap removing mechanism for cracker and like machines comprising in combination a dough conveyer, and a toothed disk scrap removing member adapted to penetrate partially only through the body material upon the conveyer.

23. Scrap removing mechanism for cracker and like machines comprising in combination a dough conveyer, and a scrap impaler and coöperating ejector both operated by movement of the dough.

In testimony whereof, I have signed my name to this specification, in the presence of two subscribing witnesses.

EDWARD E. LAWRENCE.

Witnesses:
 ROBERT H. KAMMLER,
 MAY H. LOWRY.

---

Copies of this patent may be obtained for five cents each, by addressing the "Commissioner of Patents, Washington, D. C."